United States Patent
Han et al.

(10) Patent No.: US 11,230,207 B2
(45) Date of Patent: Jan. 25, 2022

(54) MULTIDIRECTIONAL CONTROL APPARATUS FOR VEHICULAR SEAT

(71) Applicants: Hyundai Motor Company, Seoul (KR); Kia Motors Corporation, Seoul (KR); Daewon Precision Industrial Co., Ltd., Gyeonggi-do (KR)

(72) Inventors: Jong Seok Han, Gyeonggi-do (KR); Chan Ho Jung, Gyeonggi-do (KR); Ju Yeol Kong, Gyeonggi-do (KR); Suk Won Hong, Gyeonggi-do (KR); Dong Il Lee, Gyeonggi-do (KR); Byoung Tae Seo, Chungcheongnam-do (KR)

(73) Assignees: Hyundai Motor Company, Seoul (KR); Kia Motors Corporation, Seoul (KR); Daewon Precision Industrial Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/990,497

(22) Filed: Aug. 11, 2020

(65) Prior Publication Data

US 2021/0316639 A1    Oct. 14, 2021

(30) Foreign Application Priority Data

Apr. 13, 2020  (KR) .................. 10-2020-0044399

(51) Int. Cl.
*B60N 2/04*  (2006.01)
*B60N 2/64*  (2006.01)
(Continued)

(52) U.S. Cl.
CPC ............ *B60N 2/04* (2013.01); *B60N 2/0232* (2013.01); *B60N 2/64* (2013.01); *B60N 2/68* (2013.01);
(Continued)

(58) Field of Classification Search
CPC .......... B60N 2/04; B60N 2/0232; B60N 2/64; B60N 2/68; B60N 2002/0236;
(Continued)

(56) References Cited

U.S. PATENT DOCUMENTS 3,006,594 A * 10/1961 Gruendler .............. B60N 2/045
248/424
5,975,508 A * 11/1999 Beard .................... B60N 2/501
180/89.12

(Continued)

FOREIGN PATENT DOCUMENTS

CN           105667350 A       6/2016

*Primary Examiner* — Mark R Wendell
(74) *Attorney, Agent, or Firm* — Mintz Levin Cohn Ferris Glovsky and Popeo, P.C.; Peter F. Corless (57) ABSTRACT

A multidirectional control apparatus for a vehicular seat is provided to perform anteroposterior tilting, lateral tilting, control of height and tilting in other directions in consideration of the body size of a passenger and the traveling environment. The multidirectional control apparatus improves passenger comfort by tilting the seat in a lateral direction when entering or exiting a vehicle, prevents the passenger from leaning to one side by tilting the seat in a lateral direction during turning of the vehicle, and offers a safety function of protecting the passenger by inclining the seat in the direction of a collision in the event of a collision of the vehicle.

8 Claims, 10 Drawing Sheets

(51) Int. Cl.
    *B60N 2/02*       (2006.01)
    *B60N 2/68*       (2006.01)

(52) U.S. Cl.
    CPC .................. *B60N 2002/024* (2013.01); *B60N 2002/0236* (2013.01)

(58) Field of Classification Search
    CPC ... B60N 2002/024; A47C 1/022; A47C 1/024; A47C 1/0242
    USPC ........................................................ 297/330
    See application file for complete search history.

(56) References Cited

U.S. PATENT DOCUMENTS

| | | | |
|---|---|---|---|
| 6,533,235 B1* | 3/2003 | Dymerski | B60N 2/0232 248/421 |
| 6,616,117 B2* | 9/2003 | Gryp | B60N 2/501 248/421 |
| 7,543,792 B1 | 6/2009 | Ursel et al. | |
| 8,414,054 B2* | 4/2013 | Komatsubara | B60N 2/1817 296/65.02 |
| 2002/0121803 A1 | 9/2002 | Schooler | |
| 2002/0135214 A1* | 9/2002 | Ursel | B60N 2/1885 297/330 |
| 2004/0075322 A1* | 4/2004 | Jaeger | B60N 2/1853 297/325 |
| 2007/0252420 A1 | 11/2007 | Dungey et al. | |
| 2016/0221481 A1* | 8/2016 | Sugiyama | B60N 2/686 |
| 2020/0047642 A1* | 2/2020 | Han | B60N 2/045 |
| 2021/0114487 A1* | 4/2021 | Han | B60N 2/0232 |

\* cited by examiner

MULTIDIRECTIONAL CONTROL APPARATUS FOR VEHICULAR SEAT

CROSS-REFERENCE TO RELATED APPLICATION

This application claims under 35 U.S.C. § 119(a) the benefit of priority to Korean Patent Application No. 10-2020-0044399 filed on Apr. 13, 2020, the entire contents of which are incorporated herein by reference.

BACKGROUND

(a) Technical Field

The present disclosure relates to a multidirectional control apparatus for a vehicular seat, and more particularly, to a multidirectional control apparatus for a vehicular seat that performs various tilting operations to realize various orientations of the seat such as anteroposterior tilting, lateral tilting, control of height and tilting in other directions.

(b) Background Art

Generally, a vehicular seat includes at the outside and inside thereof with various seat control apparatus in addition to essential components such as a seat cushion on which a passenger lower body disposed, a seat back on which a passenger upper body leans, and a headrest for supporting a neck and head of a passenger. The seat control apparatus includes a tilting device configured to adjust a tilting angle of the seat cushion, a height control device configured to adjust the height of the seat, a seat position control device configured to adjust an anteroposterior position of the seat and the like, which are mounted independently on the seat.

However, since the direction in which a seat is adjusted by the conventional seat control apparatus is limited to a vertical direction and an anteroposterior direction, there is a disadvantage in that it is impossible to implement free change of orientation of the seat according to the body size of a passenger and the traveling environment.

The above information disclosed in this section is merely for enhancement of understanding of the background of the invention, and therefore it may contain information that does not form the prior art that is already known in this country to a person of ordinary skill in the art.

SUMMARY

The present invention provides a multidirectional control apparatus for a vehicular seat, which is capable of performing anteroposterior tilting, lateral tilting, control of height and tilting in other directions according to a body size of a passenger and a traveling environment, thereby realizing various orientations of the vehicular seat.

In one aspect, the present invention provides a multidirectional control apparatus for a vehicular seat that may include a seat cushion frame having a seat cushion lower frame and a seat cushion lower frame, which are mounted on a seat rail, a first motor disposed at a center of a front side of the seat cushion upper frame, second and third motors, which are respectively disposed at two lateral sides of a rear side of the seat cushion upper frame, a first support link mounted on a support bracket formed at a front side of the seat cushion lower frame, second and third support links, which are respectively mounted on support brackets formed at two lateral sides of a rear side of the seat cushion lower frame, a first rotational link, which is connected at a first end thereof to the first motor to receive turning force from the first motor and is rotatably coupled at a second end thereof to an upper end of the first support link, a second rotational link, which is connected at a second end thereof to the second motor to receive turning force from the second motor and is rotatably coupled at a second end thereof to an upper end of the second support link, and a third rotational link, which is connected at a first end thereof to the third motor to receive turning force from the third motor and is rotatably coupled at a second end thereof to an upper end of the third support link.

In an exemplary embodiment, the first motor, the first rotational link and the first support link may be arranged linearly in an anteroposterior direction. In addition, the second motor, the second rotational link and the second support link may be arranged in an oblique direction, which is inclined toward an inside of the seat cushion frame. The third motor, the third rotational link and the third support link may be arranged in an oblique direction, which is inclined toward an inside of the seat cushion frame.

The second end of each of the first to third rotational links may be freely and rotatably coupled to the upper end of a corresponding one of the first to third support links via a ball joint. Each of the ball joints may include a ball shaft pivotably coupled to the upper end of a corresponding one of the first to third support links, and a ball housing, which is mounted in the second end of a corresponding one of the first to third rotational links and is open at two lateral side faces thereof to allow the ball shaft to be fitted thereinto. In addition, each of the first to third rotational links may include at a first tend thereof an internal gear, which is engaged with an output gear of a corresponding one of the first to third motors.

The multidirectional control apparatus may further include a first motor-mounting bracket formed at a center of a front end of the seat cushion upper frame to allow the first motor to be mounted thereon, and second and third motor-mounting brackets respectively formed at two lateral side portions of a rear end of the seat cushion upper frame to allow the second and third motors to be respectively mounted thereon. The first to third motor-mounting brackets formed at the seat cushion upper frame may be in close or abutting contact with gear boxes of the first to third motors, and may be bolted thereto.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments which may be included within the spirit and scope of the invention as defined by the appended claims.

Figure 1:
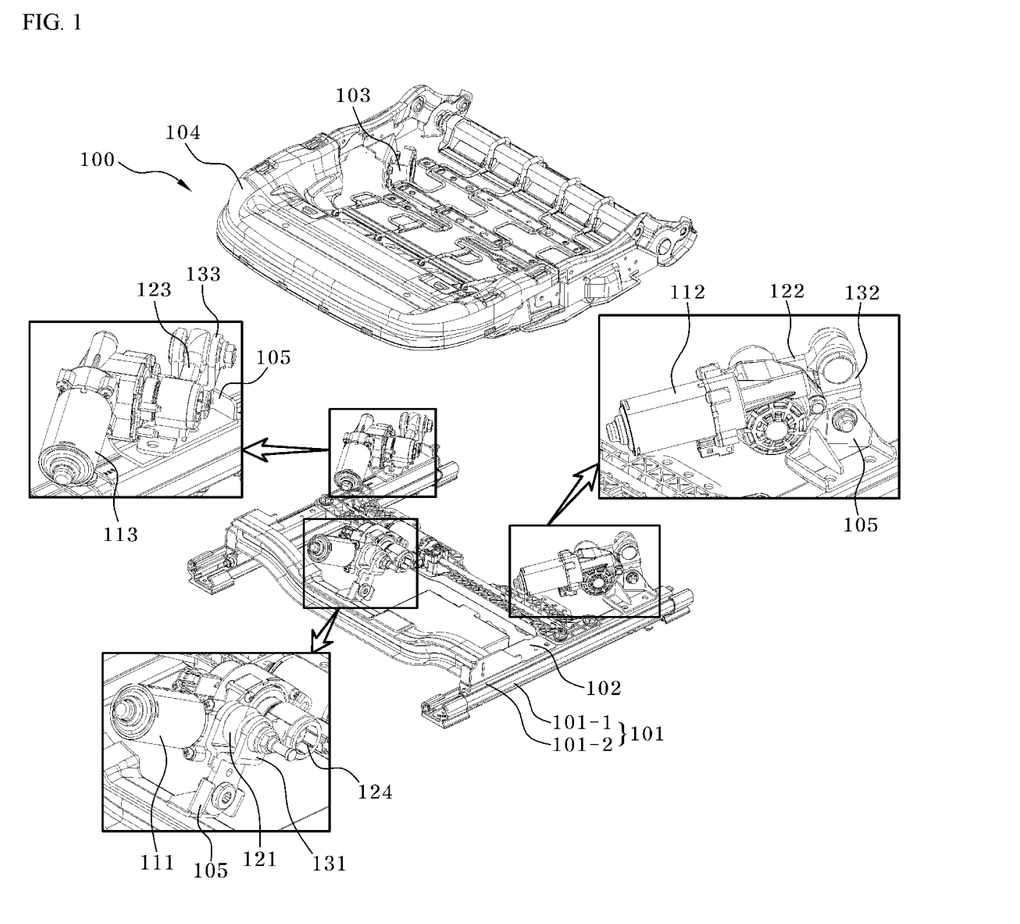
FIG. 1 is an exploded perspective view illustrating a multidirectional control apparatus for a vehicular seat according to an exemplary embodiment of the present invention.
Figure 2:
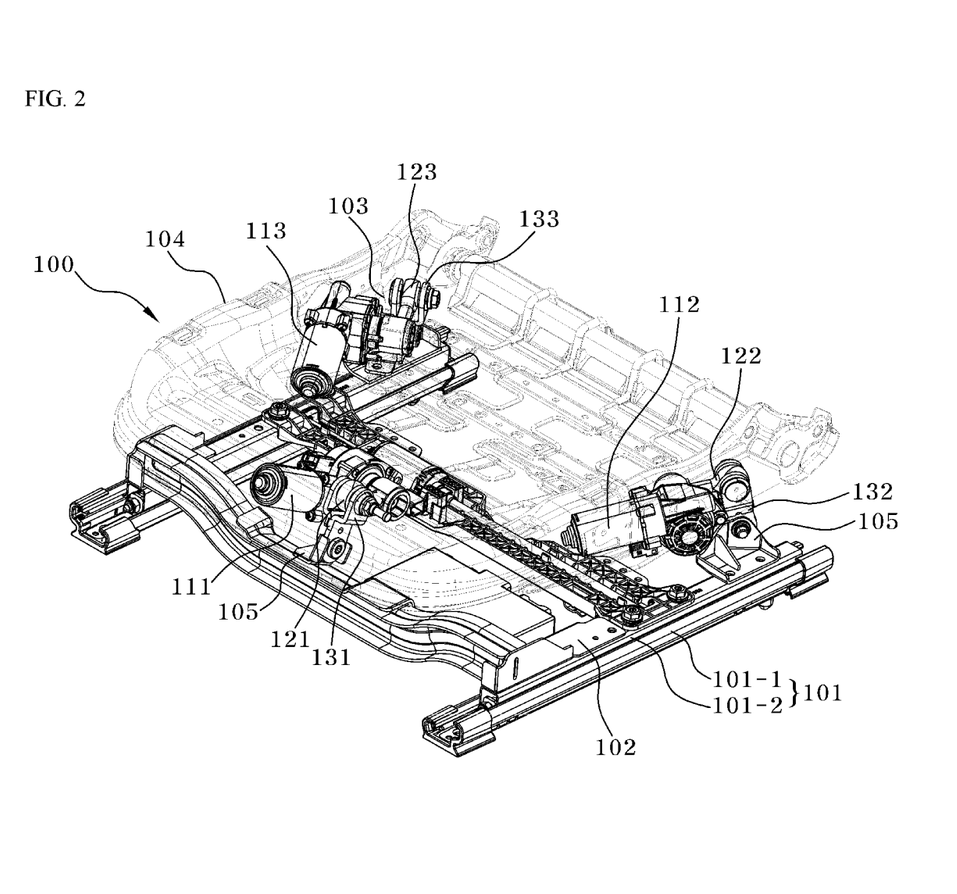
FIG. 2 is an assembled perspective view illustrating the multidirectional control apparatus for a vehicular seat according to the exemplary embodiment of the present invention.
Figure 3:
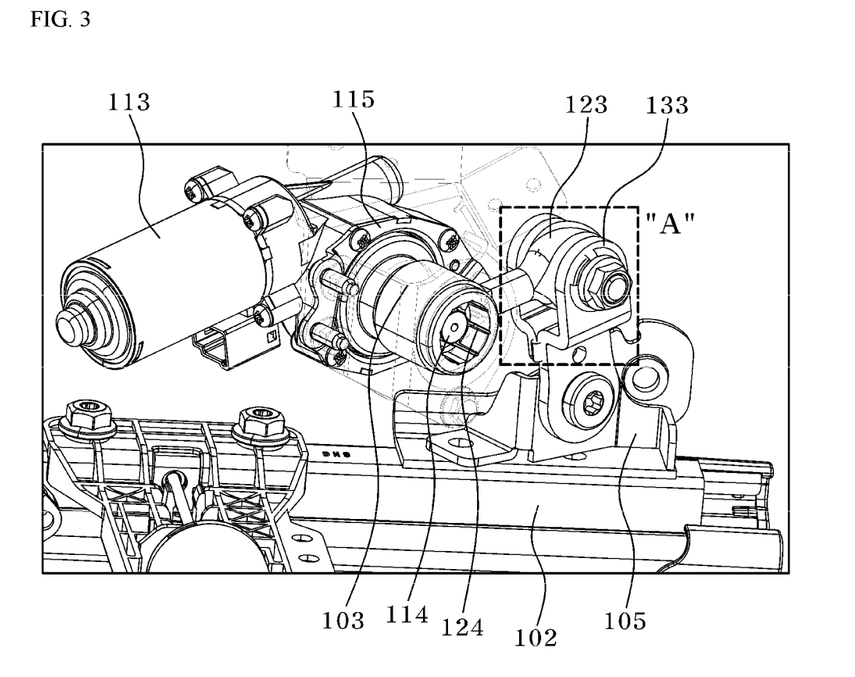
FIG. 3 is an enlarged perspective view illustrating a connection structure between a motor and a rotational link and a connection structure between the rotational link and a support link, among the components of the multidirectional control apparatus for a vehicular seat according to the exemplary embodiment of the present invention.

Hereinafter, an exemplary embodiment of the present invention will be described in detail with reference to the accompanying drawings. FIGS. 1 to 3 are perspective views illustrating a multidirectional control apparatus for a vehicular seat according to an exemplary embodiment of the present invention, in which reference numeral 100 denotes a seat cushion frame.

The seat cushion frame 100 may include a seat cushion lower frame 102, mounted on seat rails 101, and a seat cushion upper frame 104, on which a plurality of motor-mounting brackets 103 are disposed. Each of the seat rails 101 may include a stationary rail 101-1, fixedly mounted on a floor panel, and a movable rail 101-2 mounted on the stationary rail 101-1 to be movable anteroposteriorly. The seat cushion lower frame 102 may be mounted on the movable rails 101-2 to adjust the position of the entire seat in an anteroposterior direction.

The exemplary embodiment of the present invention allows the height of the seat and the tilting direction of the seat to be adjusted to a desired direction using at least three motors. Accordingly, a first motor 111 may be mounted at the center of a front side of a lower portion of the seat cushion upper frame 104, and a second motor 112 and a third motor 113 may be respectively mounted at the two lateral sides of the rear side of the lower portion of the seat cushion upper frame 104.

When the motors 111, 112 and 113 are mounted on the seat cushion upper frame 104, for implementation of various orientations such as multidirectional tilting and height control of the seat, the first motor 111 may be mounted to be oriented linearly and anteroposteriorly when viewed from above, and the second motor 112 and the third motor 113 may be mounted to be inclined inwards toward the inside of the seat cushion 100 when viewed from above. In particular, the seat cushion upper frame 104 may be formed integrally with a plurality of motor-mounting brackets 103, which cover and support all of the gear boxes 115 of the first to third motors 111, 112 and 113. Accordingly, the first to third motors 111, 112 and 113 may be secured to respective motor-mounting brackets 103 of the seat cushion upper frame 104 by respectively disposing the gear boxes of the first to third motors 111, 112 and 113 into the motor-mounting brackets 103 of the seat cushion upper frame 104 and then bolting the gear boxes of the first to third motors 111, 112 and 113 to the respective motor-mounting brackets 103.

A first support link 131, which is connected to the first motor 111 via a first rotational link 121, may be mounted at the center of the front side of the upper portion of the seat cushion lower frame 102, and a second support link 132, which is connected to the second motor 112 via a second rotational link 122, may be mounted at a portion of the rear side of the seat cushion lower frame 102. A third support link 133, which is connected to the third motor 113 via a third rotational link 123, may be mounted at another portion of the rear side of the seat cushion lower frame 102. The lower ends of the first to third support links 131, 132 and 133 may be mounted on respective support brackets 105 formed at the seat cushion lower frame 102.

When the support links 131, 132 and 133 are mounted on the seat cushion lower frame 102, for implementation of various orientations such as multidirectional tilting and height control of the seat, the first support link 131 may be linearly mounted in an anteroposterior direction when viewed from above, the second support link 132 and the third support link 133 may be mounted to be inclined inwards toward the inside of the seat cushion frame 100 when viewed from above. As mentioned above, the first motor 111 and the first support link 131 may be connected to each other via the first rotational link 121, and the second motor 112 and the second support link 132 may be connected to each other via the second rotational link 122. The third motor 113 and the third support link 133 may be connected to each other via the third rotational link 123.

First end of the first rotational link 121 may be connected to the first motor 111 to receive the rotational force, and a second end of the first rotational link 121 may be coupled to the upper end of the first support link 131 via a ball joint member to be rotatable in four directions. A first end of the second rotational link 122 may be connected to the second motor 112 to receive the rotational force, and a second end of the second rotational link 122 may be coupled to the upper end of the second support link 132 via a ball joint member to be rotatable in four directions. Additionally, a first end of the first rotational link 123 may be connected to the third motor 113 to receive rotational force, and a second end of the third rotational link 123 may be coupled to the upper end of the third support link 133 via a ball joint member to be rotatable in four directions.

Figure 4:
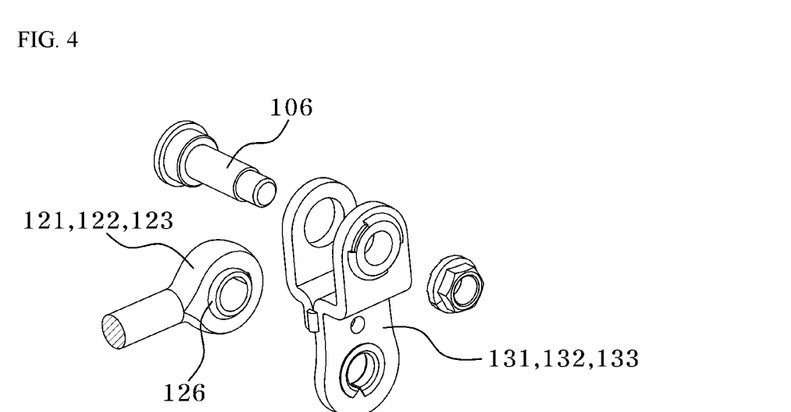
FIG. 4 is a fragmentary enlarged view illustrating a ball-joint-coupling portion of the support link, among the components of the multidirectional control apparatus for a vehicular seat according to the exemplary embodiment of the present invention.

Furthermore, each of the ball joint members may include a ball shaft 106 pivotably coupled to the upper end of a corresponding one of the first to third support links 131, 132 and 133 and a ball housing 126 formed through the lower end of a corresponding one of the first to third rotational link 121, 122 and 123 to allow the ball shaft 106 to be fitted thereinto and coupled thereto, as illustrated in FIG. 4. Accordingly, since the lower end of each of the first to third rotational links 121, 122 and 123 is rotatable from front to back and from side to side along the surface of the ball housing 126, into which the ball shaft 106 is fitted, in the manner of a free hinge, the lower end of each of the first to third rotational links 121, 122 and 123 may be rotatable in four directions.

The upper end of each of the first to third rotational links 121, 122 and 123 may include an internal gear 124, which is engaged with the output gear 114 of a corresponding one of the first to third motors 111, 112 and 113, to make it possible to transmit the rotational power of the corresponding one of the first to third motors 111, 112 and 113 to the corresponding one of the first to third rotational links 121, 122 and 123, as illustrated in FIG. 3. Specifically, the upper end of each of the first to third rotational links 121, 122 and 123 may have a cylindrical shape including the internal gear 124 formed on the inner surface thereof, and the output gear 114 of each of the first to third motors 111, 112 and 113 may have a spur-gear shape and thus, the output gear 114 may befitted into and engaged with the internal gear 124 for power transmission.

When all of the first to third motors 111, 112 and 113, the first to third rotational links 121, 122 and 123 and the first to third support links 131, 132 and 133 are completely mounted as described above, the first motor 111, the first rotational link 121 and the first support link 131 are linearly arranged in anteroposterior direction and linearly when viewed from above. Meanwhile, the second motor 112, the second rotational link 122 and the second support link 132 may be arranged in an oblique direction which is inclined toward the inside of the seat cushion frame 100 when viewed from above, and the third motor 113, the third rotational link 123 and the third support link 133 may also be arranged in an oblique direction which is inclined toward the inside of the seat cushion frame 100.

The operations of the multidirectional control apparatus for a vehicular seat according to the exemplary embodiment of the present invention, which is constructed in this way, will now be described.

Control of Anteroposterior Tilting of a Seat

Figure 5:
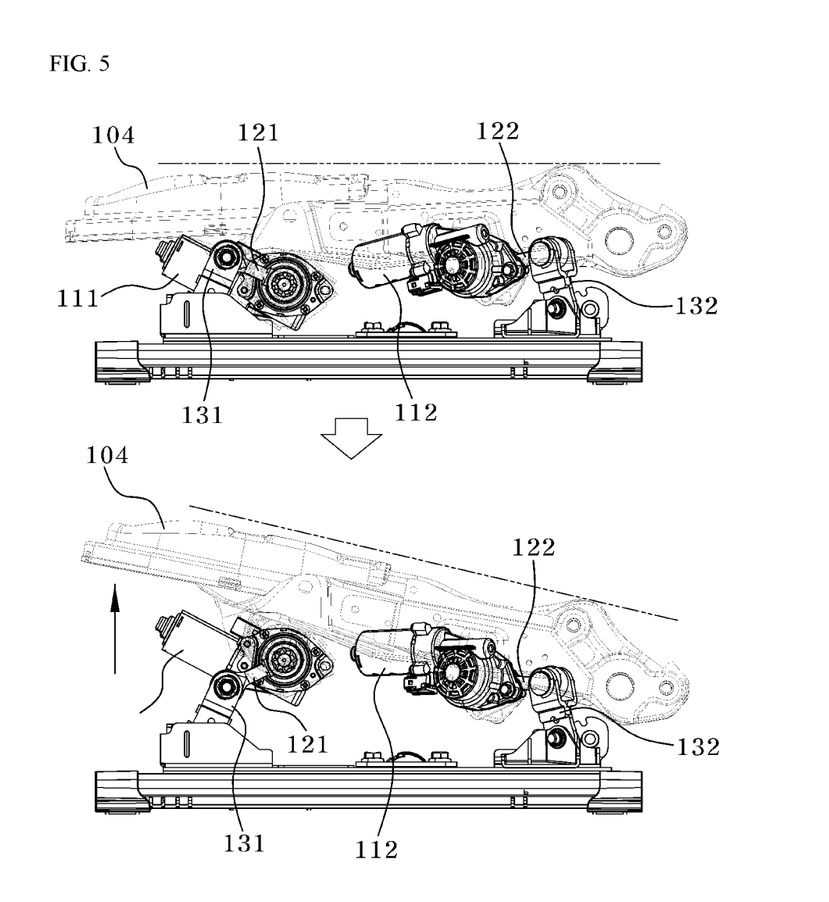
FIG. 5 is a side view illustrating the state in which the anteroposterior tilting of the seat is performed by the multidirectional control apparatus for a vehicular seat according to the exemplary embodiment of the present invention.

FIG. 5 is a side view illustrating the state in which the anteroposterior tilting of the seat is performed by the multidirectional control apparatus for a vehicular seat according to the exemplary embodiment of the present invention. By lifting the front end of the seat cushion upper frame 104 to cause the front end of the seat cushion upper frame 104 to be higher than the rear end of the seat cushion upper frame 104 through the multidirectional control apparatus according to the exemplary embodiment of the present invention, it may be possible for a passenger to be seated with a more relaxed posture.

Accordingly, the first motor 111 mounted at the front side of the seat cushion upper frame 104 may be activated to rotate the output gear 114 in one direction (e.g., a first direction), and the rotational force of the output gear 114 in the one direction may be transmitted to the internal gear 124 of the first rotational link 121. Consequently, the first rotational link 121 may be rotated forward about the point at which the first rotational link 121 is coupled to the first support link 131 via the ball joint member. In other words, the first rotational link 121 may be rotated forward and may be raised about the first support link 131 serving as a support.

In particular, since the first rotational link 121 is rotated forward and raised about the first rotational link 131, serving as a support, and the front end of the seat cushion upper frame 104 is also pushed upwards, tilting control, in which the front end of the seat cushion becomes higher than the rear end of the seat cushion is achieved. Accordingly, it may be possible to realize a seating posture in which the pressure of a body of a passenger is optimally distributed and the passenger comfort is improved.

Control of Height of a Seat

Figure 6:
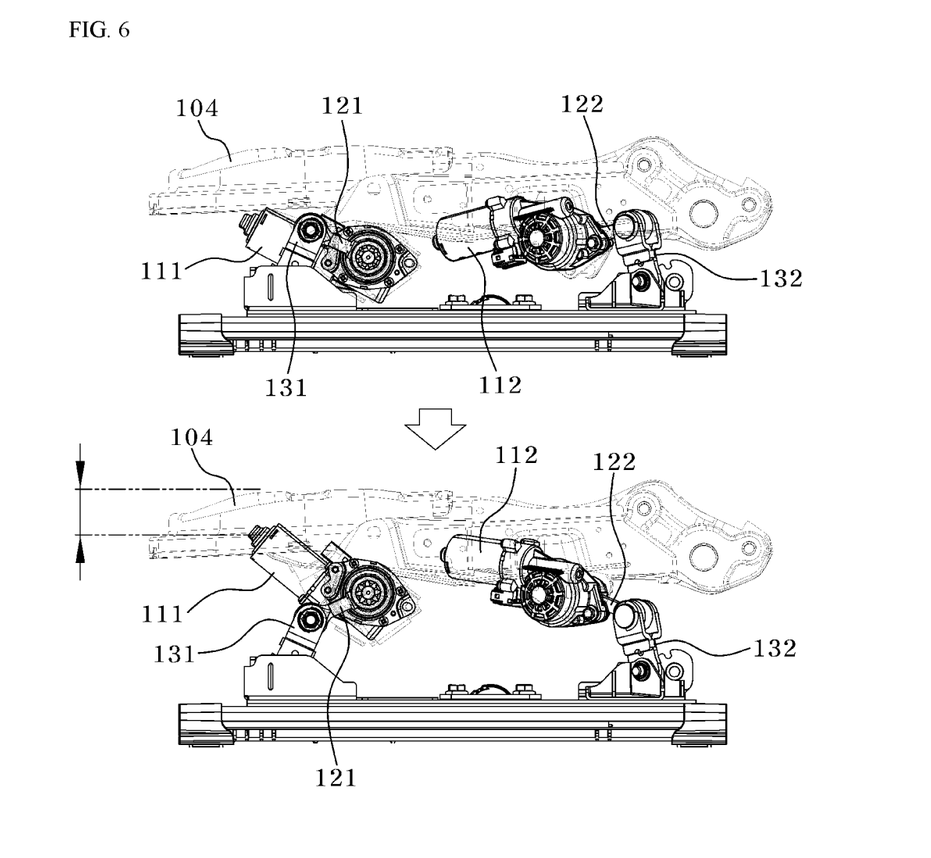
FIG. 6 is a side view illustrating the state in which the height of the seat is raised by the multidirectional control apparatus for a vehicular seat according to the exemplary embodiment of the present invention.

FIG. 6 is a side view illustrating the state in which the height of the seat is raised by the multidirectional control apparatus for a vehicular seat according to the exemplary embodiment of the present invention. The multidirectional control apparatus for a vehicular seat according to the exemplary embodiment of the present invention is capable of adjusting the overall height to which the seat is raised by simultaneously raising the front end and the rear end of the seat cushion upper frame 104. Notably, the multidirectional control apparatus described herein is operated by a controller.

Accordingly, the first motor 111 mounted at the front side of the seat cushion upper frame 104 may be activated to rotate the output gear 114 in one direction (e.g., first direction), and then the rotational force of the output gear 114 in the one direction (e.g., first direction) may be transmitted to the internal gear 124 of the first rotational link 121. At the same time, the second motor 112 and the third motor 113, which are mounted at the two lateral sides of the rear side of the seat cushion upper frame 104, may be activated to rotate the respective output gears 114 of the second and third motors 112 and 113, and then the rotational force of the output gears 114 in the one direction (e.g., first direction) may be transmitted to the respective internal gears 124 of the second rotational link 122 and the third rotational link 123.

Consequently, the first rotational link 121 may be rotated forward about the point at which the first rotational link 121 is coupled to the first support link 131 via the ball joint. At this point, the first rotational link 121 may be rotated forward and upwards about the first support link 131, serving as a support, and thus may be moved upwards. At the same time, the second rotational link 122 and the third rotational link 123 may also be rotated rearwards about the respective points at which the second rotational link 122 and the third rotational link 123 are respectively coupled to the second and third support links 132 and 133 via the ball joints. At this point, the second rotational link 122 and the third rotational link 123 may be rotated rearwards and upwards about the second support link 132 and the third support link 133, which serve as supports, and thus may be moved upwards.

At this point, since the first rotational link 121 may be rotated forward and upwards about the first support link 131, serving as a support, the front end of the seat cushion upper frame 104 may be pushed upwards and thus may be raised. Meanwhile, since the second rotational link 122 and the third rotational link 123 are also rotated rearwards and upwards about the second support link 132 and the third support link 133, which serve as supports, the rear end of the seat cushion upper frame 104 may be pushed upwards and thus raised. In this way, it may be possible to adjust the height to which the seat is raised by simultaneously raising both the front end and the rear end of the seat cushion upper frame 104. An operation of adjusting the height to which the seat is lowered may be performed in the reverse order.

Control of Lateral Tilting of a Seat

Figure 7:
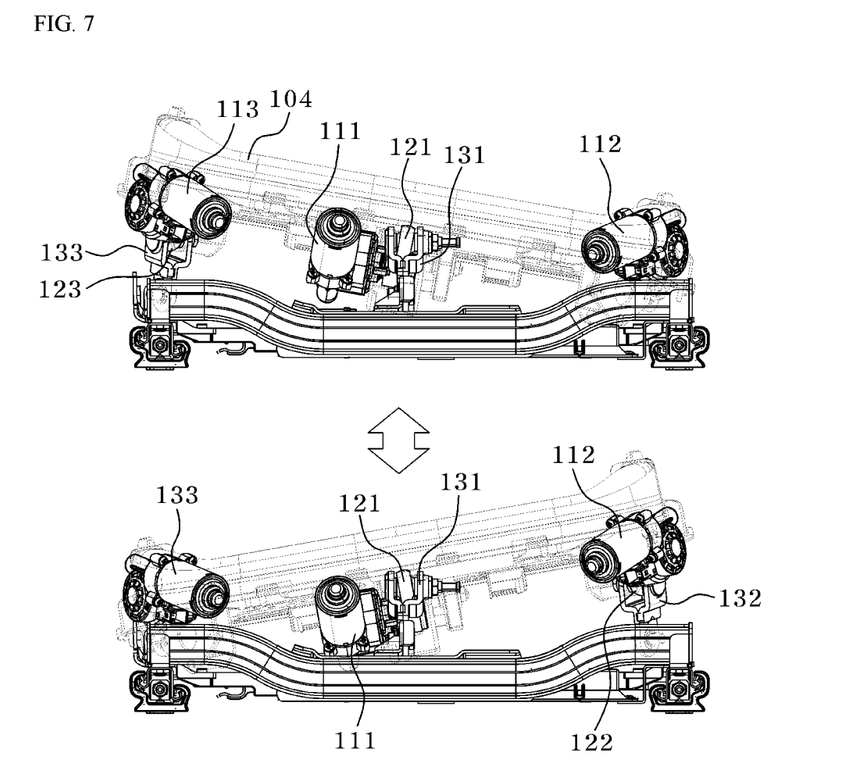
FIG. 7 is a front view illustrating the state in which lateral tilting of the seat is performed by the multidirectional control apparatus for a vehicular seat according to the exemplary embodiment of the present invention.

FIG. 7 is a front view illustrating the state in which the lateral tilting of the seat is performed by the multidirectional control apparatus for a vehicular seat according to the exemplary embodiment of the present invention. The multidirectional control apparatus according to the exemplary embodiment of the present invention is capable of performing lateral tilting of the seat by raising one lateral side portion or the other lateral side portion of the seat cushion upper frame 104.

Accordingly, the second motor 112 or the third motor 113, which are mounted at the two lateral sides of the rear side of the seat cushion upper frame 104, may be activated to rotate the output gear 114 of the motor in one direction, and then the rotational force of the output gear 114 in the one direction may be transmitted to the internal gear 124 of the second rotational link 122 or the third rotational link 123. Consequently, the second rotational link 122 or the third rotational link 123 may be rotated rearwards. At this point, the second rotational link 122 or the third rotational link 123 may be rotated rearwards and upwards about the second support link 132 or the third support link 133, which serves as a support, and thus may be raised.

In particular, when the seat cushion upper frame 104 is tilted leftwards or rightwards (e.g., to the left or right), the middle portion of the seat cushion upper frame 104 in a lateral width direction must also be tilted according to the leftward or rightward tilting angle of the seat cushion upper frame 104. Therefore, the first motor 111, mounted at the front side of the seat cushion upper frame 100, may be activated to rotate the output gear 114 in one direction, and then the rotational force of the output gear 114 in the one direction may be transmitted to the internal gear 124 of the first rotational link 121. Consequently, the first rotational link 121 may be rotated forward and upwards about the first support link 131, serving as a support, and thus may be raised.

Meanwhile, the second rotational link 122 or the third rotational link 123 may be rotated rearwards or upwards about the second support link 132 or the third support link 133 serving as a support, and thus the left end or the right end of the seat cushion upper frame 104 may be pushed upwards, thereby performing lateral tilting of the seat. In this way, since the seat is tilted in one lateral direction toward a door, it may be possible to improve the comfort of a passenger when entering and exiting the vehicle. Furthermore, it may be possible to prevent a passenger from leaning to one side during turning vehicle operation by tilting the seat in the opposite direction of the turning of the vehicle, that is, leftwards or rightwards.

Control of Tilting of Seat in Other Directions

FIGS. 8A to 8D are perspective views illustrating the states in which the seat is tilted in other directions by the multidirectional control apparatus for a vehicular seat according to the exemplary embodiment of the present invention. The multidirectional control apparatus for a vehicular seat according to the exemplary embodiment of the present invention is capable of tilting the seat cushion upper frame 104 in any direction (e.g., in the direction of any corner of the seat cushion upper frame). Accordingly, the rotational driving amounts of the first to third motors 111, 112 and 113 may be operated to be appropriately distributed.

Figure 8A:
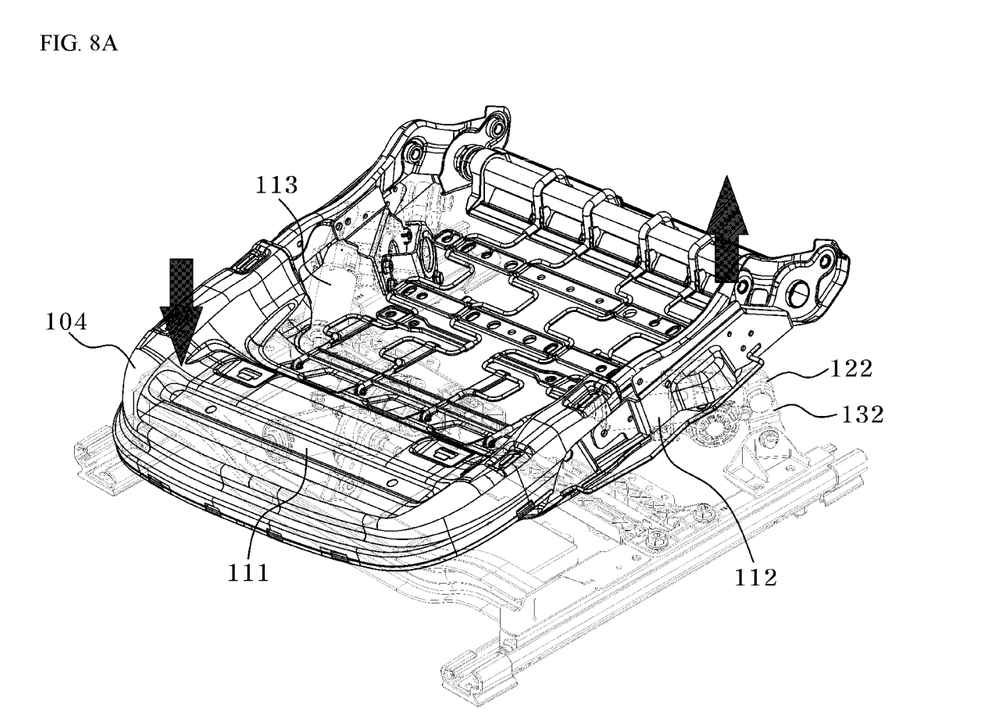
FIGS. 8A to 8D are perspective views illustrating the states in which the seat is tilted in other directions by the multidirectional control apparatus for a vehicular seat according to the exemplary embodiment of the present invention.

In an example, the first rotational link 121 may be rotated downwards by rotational driving of the first motor 111 to lower the front end of the seat cushion upper frame 104, and at the same time the second rotational link 122 may be rotated upwards by rotational driving of the second motor 112 to raise one lateral side portion of the rear end of the seat cushion upper frame 104. As a result, among tilting operations in other directions, a tilting operation of raising only one rear corner of the seat cushion upper frame 104 may be performed, as illustrated in FIG. 8A.

Figure 8B:
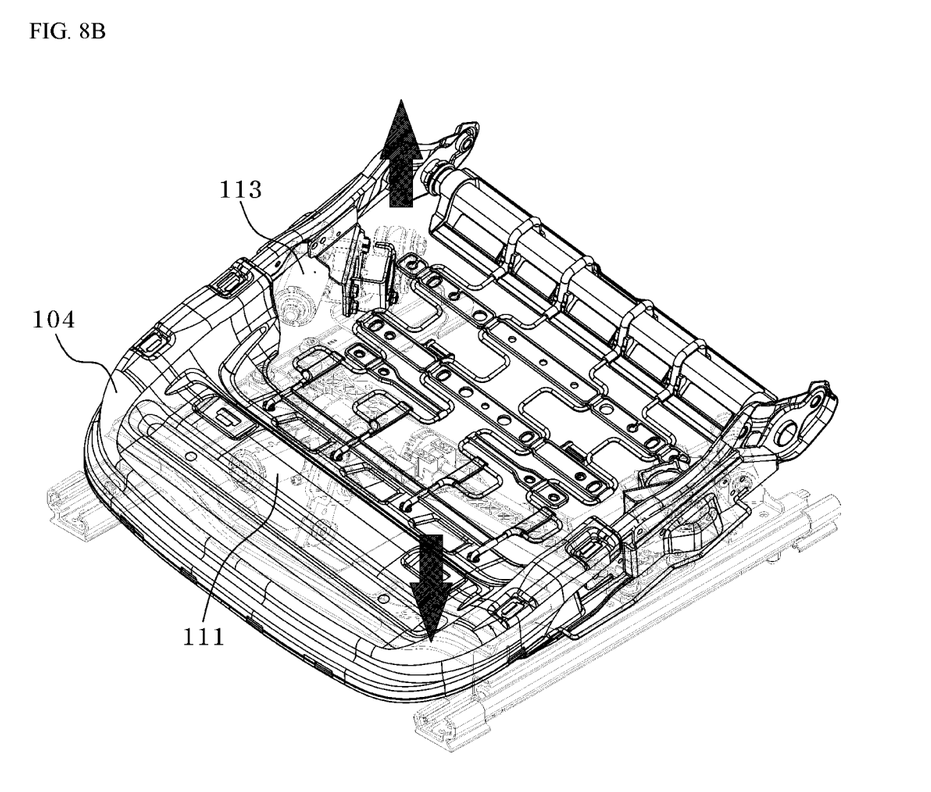

In another example, the first rotational link 121 may be rotated downwards by rotational driving of the first motor 111 to lower the front end of the seat cushion upper frame 104, and at the same time the third rotational link 123 may be rotated upwards by rotational driving of the third motor 112 to raise the other rear end of the seat cushion upper frame 104. As a result, among tilting operations in other directions, a tilting operation of raising only the other rear end of the seat cushion upper frame 104 may be performed, as illustrated in FIG. 8B.

Figure 8C:
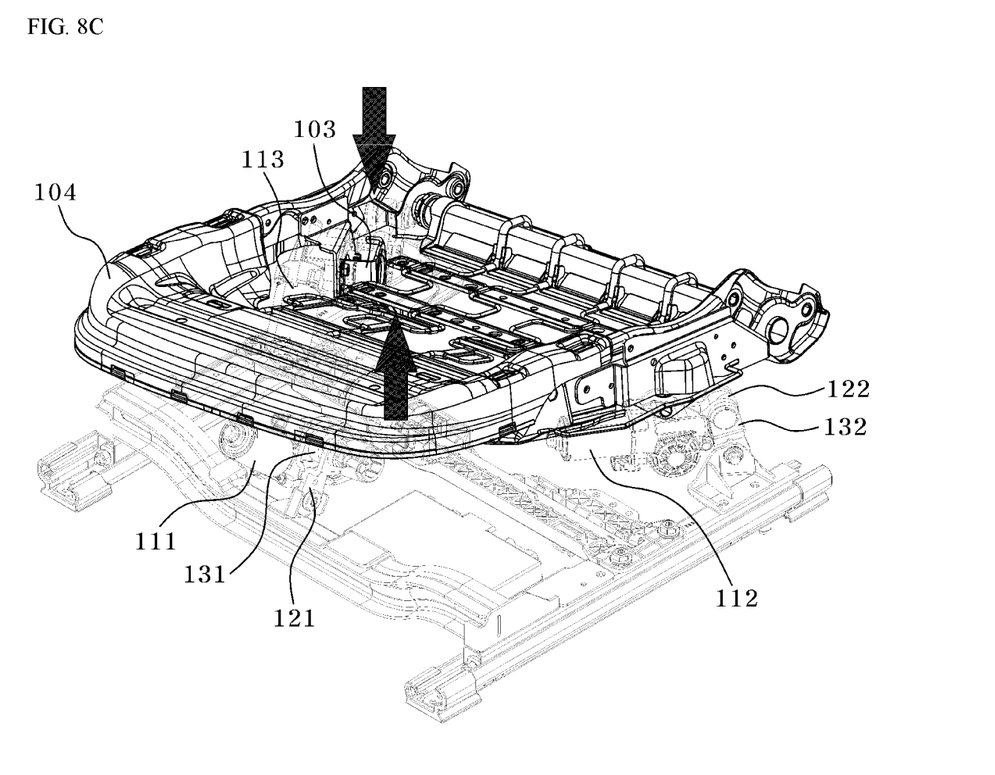

In a further example, the first rotational link 121 may be rotated upwards by rotational driving of the first motor 111 to raise the front end of the seat cushion upper frame 104, and at the same time the second rotational link 122 may be rotated upwards by rotational driving of the second motor 112 to raise one lateral side portion (e.g., a first lateral side portion) of the rear end of the seat cushion upper frame 104. As a result, among tilting operations in other directions, a tilting operation of raising only a front corner of the seat cushion upper frame 104 may be performed, as illustrated in FIG. 8C.

Figure 8D:
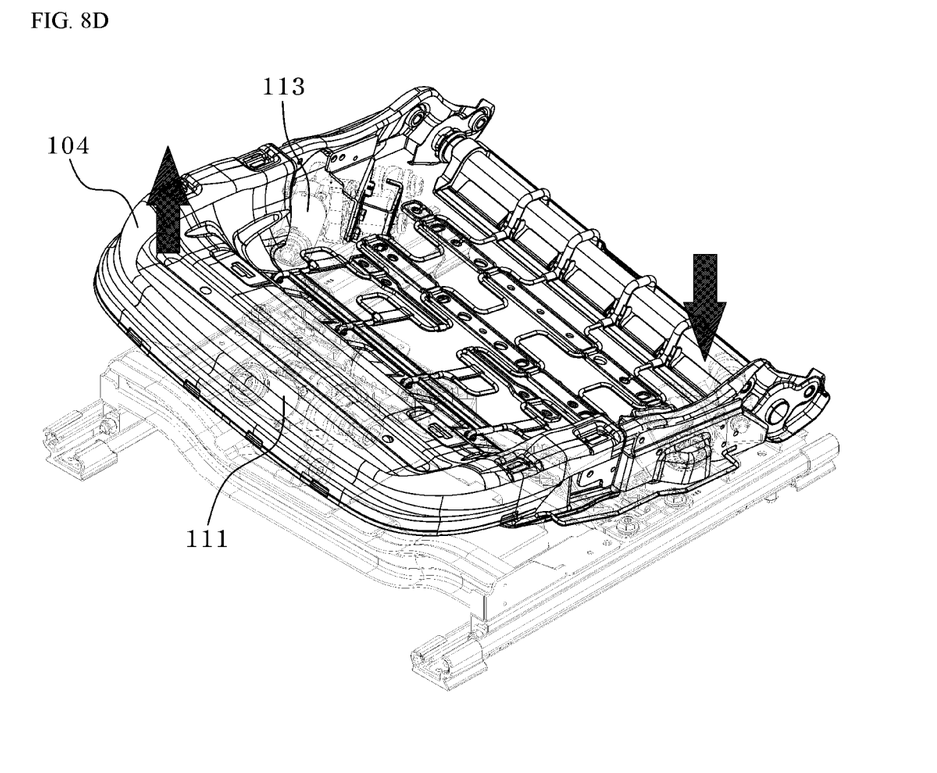

In a still further example, the first rotational link 121 may be rotated upwards by rotational driving of the first motor 111 to raise the front end of the seat cushion upper frame 104, and at the same time the third rotational link 123 may be rotated upwards by rotational driving of the third motor 113 to raise the other lateral side portion (e.g., a second lateral side portion) of the rear end of the seat cushion upper frame 104. As a result, among tilting operations in other directions, a tilting operation of raising only the other front corner of the seat cushion upper frame 104 may be performed, as illustrated in FIG. 8D.

As described above, since the multidirectional control apparatus for a vehicular seat according to the exemplary embodiment of the present invention is capable of tilting the seat cushion upper frame 104 in any direction in addition to the anteroposterior direction and the lateral direction, it may be possible to offer a safety function of protecting a passenger in the event of collision involving the vehicle by performing control to incline the seat in the direction of the collision.

In the exemplary embodiment of the present invention, the construction in which the first motor 111 is mounted at the front side of the seat cushion upper frame 104 and the second motor 112 and the third motor 113 are respectively mounted at the two lateral sides of the rear side of the seat cushion upper frame 104 has been described. However, even though the first motor 111 may be mounted at the rear side of the seat cushion upper frame 104 and the second motor 112 and the third motor 113 may be mounted at two lateral sides of the front side of the seat cushion upper frame 104, it may be possible to perform various tilting operations of taking various orientations of the seat such as anteroposterior tilting, lateral tilting, control of height and tilting in other directions in the same manner.

By virtue of the above-described constructions, the present invention offers the following effects.

First, since anteroposterior tilting, lateral tilting, control of height and tilting in other directions are performed in consideration of the body size of a passenger and the traveling environment, it may be possible to appropriately realize various orientations of a vehicular seat.

Second, it may be possible to increase the comfort of a passenger by tilting the seat in a lateral direction when entering or exiting the vehicle.

Third, it may be possible to prevent a passenger from leaning to one side by tilting the seat in a lateral direction while the vehicle is turning.

Fourth, since a seat is inclined in the direction of collision in the event of a collision involving the vehicle, it may be possible to offer a safety function to a passenger by inclining the seat in the direction of a collision in the event of a collision of the vehicle.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A multidirectional control apparatus for a vehicular seat, comprising:
   a seat cushion frame including a seat cushion lower frame and a seat cushion upper frame, which are mounted on a seat rail;
   a first motor disposed at a center of a front side of the seat cushion upper frame;
   second and third motors, which are respectively disposed at two lateral sides of a rear side of the seat cushion upper frame;
   a first support link mounted on a support bracket formed at a front side of the seat cushion lower frame;
   second and third support links, which are respectively mounted on support brackets formed at two lateral sides of a rear side of the seat cushion lower frame;
   a first rotational link, which is connected at a first end thereof to the first motor to receive turning force from the first motor and is rotatably coupled at a second end thereof to an upper end of the first support link;
   a second rotational link, which is connected at a first end thereof to the second motor to receive turning force from the second motor and is rotatably coupled at a second end thereof to an upper end of the second support link; and
   a third rotational link, which is connected at a first end thereof to the third motor to receive turning force from the third motor and is rotatably coupled at a second end thereof to an upper end of the third support link,
   wherein the second end of each of the first to third rotational links is freely and rotatable coupled to the upper end of a corresponding one of the first to third support links via a ball joint.

2. The multidirectional control apparatus of claim 1, wherein the first motor, the first rotational link and the first support link are arranged linearly in an anteroposterior direction.

3. The multidirectional control apparatus of claim 1, wherein the second motor, the second rotational link and the second support link are arranged in an oblique direction, which is inclined toward an inside of the seat cushion frame.

4. The multidirectional control apparatus of claim 1, wherein the third motor, the third rotational link and the third support link are arranged in an oblique direction, which is inclined toward an inside of the seat cushion frame.

5. The multidirectional control apparatus of claim 1, wherein the ball joint includes:
   a ball shaft pivotably coupled to the upper end of a corresponding one of the first to third support links; and
   a ball housing, which is mounted in the second end of a corresponding one of the first to third rotational links and is open at two lateral side faces thereof to fit the ball shaft thereinto.

6. The multidirectional control apparatus of claim 1, wherein each of the first to third rotational links includes at the first end thereof with an internal gear, which is engaged with an output gear of a corresponding one of the first to third motors.

7. The multidirectional control apparatus of claim 1, further comprising:
   a first motor-mounting bracket formed at a center of a front end of the seat cushion upper frame and the first motor is mounted thereon; and
   second and third motor-mounting brackets respectively formed at two lateral side portions of a rear end of the seat cushion upper frame and the second and third motors are respectively mounted thereon.

8. The multidirectional control apparatus of claim 7, wherein the first to third motor-mounting brackets formed at the seat cushion upper frame are in abutting contact with gear boxes of the first to third motors and are bolted thereto.

* * * * *